Aug. 4, 1964    H. J. KAMINSKI ETAL    3,143,045
PHOTOGRAPHIC CAMERA OPERATION CONTROL APPARATUS
Filed Nov. 16, 1961    2 Sheets-Sheet 1
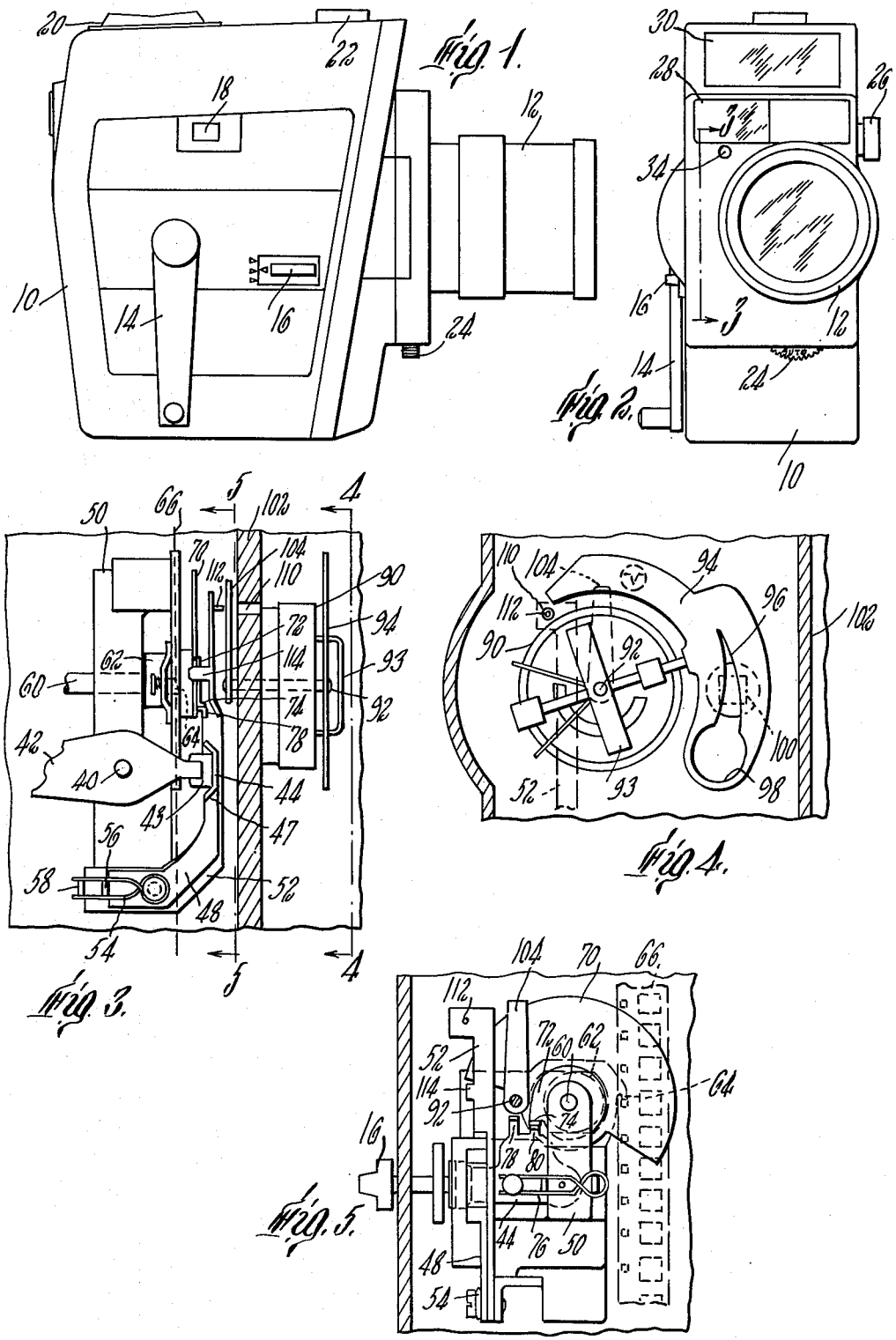

Aug. 4, 1964   H. J. KAMINSKI ETAL   3,143,045
PHOTOGRAPHIC CAMERA OPERATION CONTROL APPARATUS
Filed Nov. 16, 1961   2 Sheets-Sheet 2
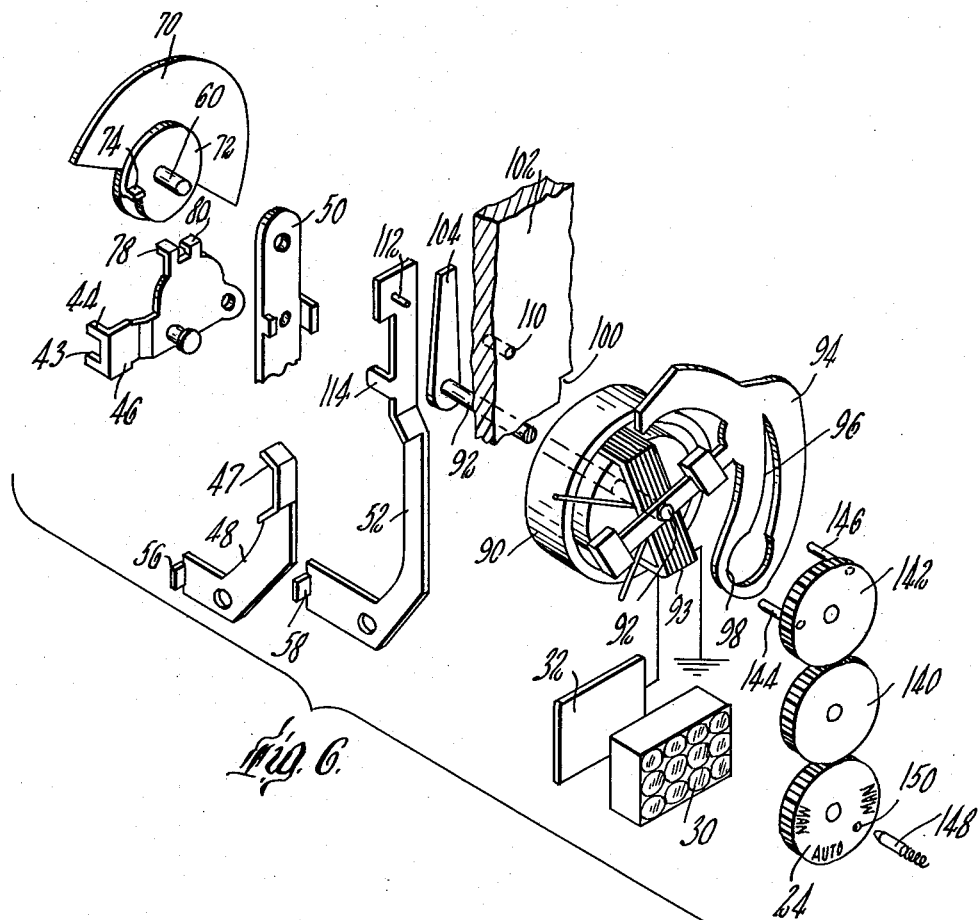
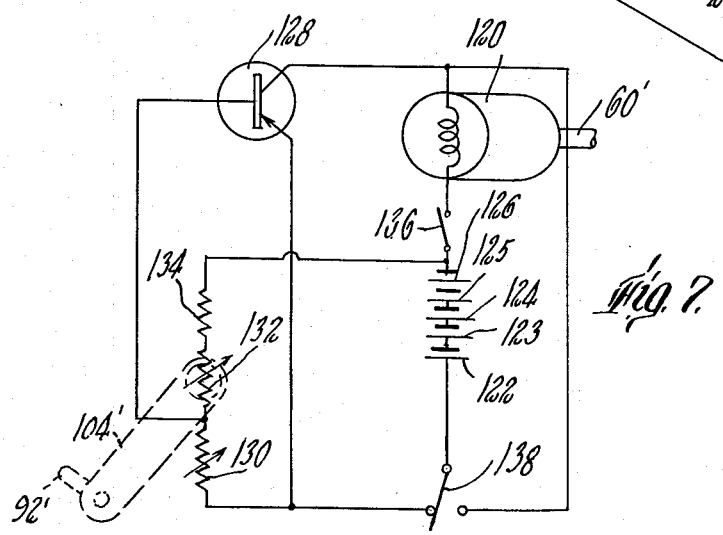

3,143,045
PHOTOGRAPHIC CAMERA OPERATION CONTROL APPARATUS

Henry J. Kaminski, Hingham, and Samuel Silbovitz, Quincy, Mass., assignors to Keystone Camera Company, Inc., Boston, Mass, a corporation of Massachusetts
Filed Nov. 16, 1961, Ser. No. 152,755
10 Claims. (Cl. 95—10)

This invention relates to photographic cameras and more particularly to mechanisms responsive to the available light for film exposure to control the operation of the camera.

A variety of automatic control systems have been devised for photographic cameras with a view towards facilitating the operation of the cameras and minimizing the chance of defective film exposure during such operation. One principal type of such automatic control systems, in general, adjusts the lens aperture as a function of the available light and film type in a manner that is coordinated with the shutter operation. Certain camera systems include a mechanically coupled arrangement which permits coordinated adjustment of the lens aperture size as a function of available light, film type and shutter speed while other systems automatically adjust the aperture size to compensate for changes in available light. There are limiting situations however where the film in the camera cannot properly be exposed in the normal manner. These situations generally occur when there is an insufficient amount of light and in such situations it is desirable to positively prevent operation of the camera so that the film cannot be improperly exposed unwittingly. This situation is particularly significant in motion picture cameras where a substantial amount of film may be improperly exposed if the operator is unaware of the fact that the available light is inadequate.

Accordingly, it is an object of the invention to provide a novel and improved camera control system for inhibiting the camera operating mechanism under light conditions outside of that range for proper film exposure.

Another object of the invention is to provide a novel and improved apparatus for controlling the operation of the shutter and film drive mechanism of a motion picture camera to prevent operation of the camera mechanism when the available light is outside of the range for proper film exposure as determined by the range of available lens apertures, shutter speed and film type.

Still another object of the invention is to provide a novel and improved control mechanism responsive to a galvanometer circuit energized by current derived from a photocell that prevents operation of the camera mechanism when there is insufficient light for proper film exposure.

A further object of the invention is to provide novel means operative in conjunction with apparatus for automatically adjusting the film exposure aperture of a camera for inhibiting camera operation when the existing light conditions are at or below the minimum required for proper film exposure.

A still further object of the invention is to provide a novel and improved camera operation inhibiting mechanism associated with manual camera operation control means which prevents operation of the camera mechanism in response to manipulation of the manual control means if the available light is outside of the permissible range for proper film exposure.

In accordance with principles of the invention a control mechanism is provided which cooperates with a light sensing element in the camera to inhibit operation of the camera mechanism when there is an improper amount of light available for proper film exposure. In the embodiments of the invention hereinafter described in detail this control mechanism is associated with a galvanometer system that is energized in response to current from a light sensitive photocell. The galvanometer is employed to automatically control the film exposure aperture in a motion picture camera as a function of the light incident on the photocell. In the disclosed type of camera, the film advancing mechanism and shutter are driven from a common shaft and a manually operable main latching mechanism cooperates with the shutter to control the rotation of that shaft either for single frame exposure or continuous film advance for multiple frame exposure. After adjustment in accordance with the type of film being employed in the camera, the photocell-galvanometer system rotates a lens aperture controlling vane having an arcuate opening of graduated dimensions to a position that admits the amount of light onto the film necessary for the proper exposure of each film frame. Cooperating with and positioned by the galvanometer is an auxiliary vane which functions to prevent operation of the camera film drive and shutter mechanism when there is an improper amount of available light. In one disclosed embodiment, a latching lever arrangement, resiliently coupled to the manual camera control element, normally may be moved to an unlatched position by the manual control element. If there is an insufficient amount of light, however, the galvanometer positions the auxiliary latch vane to prevent movement of the operative latching lever in a manner so that both the shutter and the film advance mechanism are locked. Under this condition the auxiliary vane effectively overrides the manual camera operation control element and thus prevents faulty exposure and accompanying waste of film. In a second disclosed embodiment the auxiliary vane is employed to control the energization of an electrically powered camera operating circuit to accomplish the same results; i.e., the overriding of a manual camera operating control element and the prevention of camera operation under adverse light conditions. Further, in either embodiment the apparatus accommodates a separate manually controlled element which renders the light responsive control mechanism inoperative and enables operation of the camera even though there is insufficient light for normal film exposure purposes.

The invention provides a simple and reliable light responsive control mechanism which prevents operation of the camera latch when the amount of available light is not within boundaries established by the nature of the film, the shutter speed, and the range of aperture openings available in the camera. Additional objects, features and advantages of the invention will be seen as the following description of preferred embodiments thereof progresses, in conjunction with the drawings, in which:

FIG. 1 is a side elevational view of a motion picture camera which incorporates a light responsive camera operation control mechanism constructed according to principles of the invention;

FIG. 2 is a front elevational view of the motion picture camera shown in FIG. 1;

FIG. 3 is a sectional view taken along the line 3—3 of FIG. 2 showing portions of the film drive and shutter mechanism, the galvanometer structure and the auxiliary camera operation control mechanism;

FIG. 4 is a sectional view taken along the line 4—4 of FIG. 3 showing the galvanometer structure, and the aperture controlling vane and the auxiliary vane that are driven by the galvanometer in response to signals from the light sensitive element incorporated in the camera;

FIG. 5 is a sectional view along the line 5—5 of FIG. 4 showing the arrangement of the auxiliary vane element, shutter, and cooperating manual operation inhibit mechanism;

FIG. 6 is an exploded perspective view of the components of the shutter control mechanism, and the light responsive control mechanism associated with the camera; and FIG. 7 is a schematic diagram of circuitry employed in a second embodiment constructed in accordance with principles of the invention.

The motion picture camera case 10 as shown in FIG. 1 has a lens system 12 mounted on the front end wall of the camera case; a winding handle 14, an operating switch 16 and a footage indicator 18 on one side wall; and on the top wall is a power zoom button 20 and a film type coordination dial element 22. As indicated best in FIG. 2 there is a rotatable manual lens aperture control element 24 mounted below the lens unit 12 and a manual zoom knob 26 for controlling the focusing of the lens unit mounted on the opposite side of the case from the winding handle 14. In the front area of the case, above the lens unit, there is a viewfinder window 28 and a honeycomb light baffle 30 behind which is positioned a suitable light sensing element such as a photocell 32 (see FIG. 6). Immediately below the viewfinder window 28 is a small circular window 34 which provides light for illuminating an aperture opening indicator.

The manual operating switch 16 on the side of the camera case is mounted on and rotates with a shaft 40 that extends through the wall of the camera case and to which is secured a control element 42 that is also rotatable with the shaft. The forward end of the control element engages a slot 43 in a pivotally mounted shutter release element 44 that includes an intermediate portion 46 which engages a shoe portion 47 of a first lever 48. That lever is pivotally mounted on an internal framework member 50 of the camera. A second lever 52 is mounted on the same pivot and the two levers are secured on that pivot and resiliently coupled together by spring 54 which cooperates with tabs 56 and 58.

A spring motor (not shown) which is wound by winding handle 14 supplies power to drive the main shaft 60 on which is mounted a film advancing mechanism. That mechanism includes an eccentric cam 62 driven by shaft 60 on which is mounted a film advancing claw element 64 that engages perforations in the film 66. As the film 66 is guided between a pressure plate and the aperture plate and is advanced by the claw element in a conventional manner, details of this mechanism are not shown.

Mounted forwardly of the film advancing mechanism on shaft 60 is a shutter 70 and a shutter control member 72 which has a forwardly extending tab 74, the shapes of which are best seen in FIGS. 5 and 6. The shutter release element 44 is pivotally mounted on the framework member 50 and is normally maintained in a neutral position by spring 76. The shutter release element has two upstanding tab portions 78 and 80 which are spaced laterally from one another and are disposed at slightly different heights such that the tab 74 of the shutter control member 72 normally rests on the inner tab 80. The shutter release element 44 in this position prevents rotation of the main shaft 60 so that neither the shutter nor the film advancing mechanism is operative.

When the manual operating switch 16 is tilted upwardly (clockwise rotation as viewed in FIGS. 1 and 3) the forward end of control element 42 moves down and the shutter release element 44 is moved about its pivot in a counterclockwise direction (as viewed, FIG. 5) moving tab 80 to the left out from underneath tab 74 and permitting continuous rotation of the shutter and coordinated operation of the film advancing machine for taking a series of pictures. If the manual control switch 16 is tilted downwardly the shutter release element 44 is rotated clockwise (as viewed in FIG. 5) so that the tab 80 moves to the right, releasing control member 72 so that rotation is permitted. When the shutter control member 72 (and shaft 60) has almost completed a revolution however, the tab 74 is blocked by tab 78 and further rotation of the shutter and operation of the film advancing means thus is prevented. In this operation a single frame of the film has been exposed and advanced. Upon release of the manual control switch 16 for return to its neutral position, the tab 74 slides off of the upper tab 78 and on to the lower tab 80 preparatory to the next operation.

In this camera a delicate galvanometer mechanism 90 of conventional type as generally indicated in FIG. 4 is employed for controlling the aperture opening. The galvanometer includes a shaft 92 which has a conventional winding 93 mounted on it and which is connected in circuit with the photocell 32. The galvanometer operates to rotate shaft 92 in response to minute electrical currents provided by the photocell as a function of the light impinging on it. The amount of shaft rotation for a given amount of light may be adjusted by manipulation of knob 22 so that the film speed can be coordinated with the automatic setting of the aperture opening. Secured to the shaft 92 at the forward end thereof is a lens aperture control vane 94 that has an arcuate opening 96 of graduated dimensions. The opening 96 has an enlarged end portion 98, which, when aligned, the passageway 100 in the internal wall member 102 of the camera structure permits the maximum amount of light to impinge on the film positioned immediately to the rear of passageway 100. When an increased amount of light is sensed by the photocell 32 the shaft 92 is rotated in a clockwise direction and the effective size of the passageway is narrowed by the portion of the arcuate opening 96 then positioned before that passageway 100. On the rear side of the aperture control vane is a translucent aperture index scale which is aligned to move past the window 34 (disposed immediately below the viewfinder window 28), so that the actual opening of the lens aperture as automatically adjusted by the photocell-galvanometer system is viewable by the camera user.

A second vane 104 is mounted on the shaft 92 but behind the wall 102 as indicated in FIGS. 3 and 6. This vane may be a narrow vane element with substantially straight sides as indicated in FIG. 6 or may take other shapes depending on the camera control structure with which it is employed. The entire movable galvanometer element and coupled vanes 94 and 104 are balanced and carefully supported for rotation as a unit.

A hole 110 is disposed in the wall 102 above shaft 92. The upper end of lever 52 carries a forwardly extending pin 112 which is aligned with hole 110 so that when the lever 52 is pivoted toward wall 102 pin 112 will normally enter into the hole. The lever also carries a rearwardly extending shutter stop tab 114 which is disposed in the path of the shutter 70 as generally indicated in FIGS. 3 and 5 at all times except when lever 52 has been pivoted forwardly so that pin 112 has entered hole 110.

In the operation of this mechanism, when operating lever 16 is tilted to operate the shutter release element 44 lever 48 is moved forwardly by the canning action of shutter release element portion 46 against shoe 47. As lever 48 moves forward it moves tab 56 against spring 54 which couples this movement to tab 58 of lever 52. If the photocell-galvanometer system indicates sufficient light is available, vane 104 has not been rotated to a position where it is in front of hole 110 and the forward movement of lever 52 moves stop tab 114 out of the path of shutter 70. Simultaneously, element 44 is releasing the shutter, either for one frame rotation or for continuous rotation depending on the position of lever 16, and the mechanism operates in coordinated manner to expose and advance the film in a picture taking operation.

Should there be insufficient light, however, vane 104 has been rotated in front of hole 110 by the photocell-galvanometer system. When the shutter release element 44 is pivoted the resiliently coupled linkages again endeavor to move the lever 52 toward the wall 102, but the pin contacts vane 104 and the further forward movement of lever 52 is prevented. In this position the rearwardly extending stop tab 114 on that lever remains in the path of the shutter and thus even though the shutter is freed by tab 80 it cannot rotate as its forward edge contacts and is blocked by tab 114. Due to the fact that the shutter and film advancing means are mechanically coupled together, neither is operative. This locking action is achieved without imposing any mechanical load on the galvanometer system which might impair its accuracy.

A second embodiment of the invention is illustrated in FIG. 7. In that system the camera mechanism is driven by an electric motor 120 which is powered by five 1.5 volt batteries, 122–126, connected in series. The electric motor and motor control circuitry replaces the spring motor and mechanical shutter latch mechanism of the embodiment shown in FIGS. 1–6, but the camera is otherwise similar to the camera above described, having a shutter and film advancing mechanism driven by shaft 60'; and a photocell-galvanometer system that drives shaft 92' and vane 104' as a function of the light sensed. The illustrated circuit provides the desired operation inhibiting action without imposing any additional load on the galvanometer, such as the load required to operate a motor circuit controlling micro switch for example, so that the galvanometer's principle function is accurate lens aperture control. An amplifying transistor 128, type 2N381, has its emitter electrode connected to the reference terminal of the battery at cell 122; its base electrode connected to the junction between variable resistor 130 and photocell 132; and its collector electrode connected to one terminal of the winding of motor 120. A voltage divider network of resistor 130, photocell 132 and an additional resistor 134 is connected across the set of battery cells 122–126. Switch 136, actuated by the control lever 16, is connected between the second terminal of the motor winding battery and provides manual control for operation of the motor. A second switch 138 provides for manual overriding of the automatic control as hereinafter described.

Photocell 132 is physically positioned within the camera case so that it is exposed to external light, for example, the same light as the photocell that supplies the galvanometer. When switch 138 is in the position shown in FIG. 7, the control circuitry is responsive to the vane 104' so that even though switch 136 is closed, whenever the galvanometer positions vane 104' in front of cell 132 (indicative of insufficient light for proper camera operation), substantially all light is blocked from cell 132 and its resistance increases sharply. The voltage applied to the base of transistor 128 drops correspondingly and the transistor is turned off, stopping motor 120. Should the amount of available light increase the galvanometer will rotate the shutter vane 104' out of the position in front of cell 132 so that the control circuitry may again be activated to drive the camera operating mechanism.

As the operator may desire under certain circumstances to attempt to take pictures even though there is insufficient light for normal picture taking operations there is provided a mechanical linkage between the lens opening control knob 24 and the galvanometer 90 which rotates the galvanometer to a position where the auxiliary vane 104 does not disable the camera operating mechanism so that picture taking operations may proceed independently of the amount of available light. This linkage includes the gear train indicated in FIG. 6. Knob 24 is formed as a gear which engages an idler gear 140 that in turn engages gear 142 that is positioned for rotation about the same axis as galvanometer 90. Gear 142 carries two spaced prongs 144, 146, that straddle a galvanometer element such as the coil structure 93. By rotation of knob 24 in one direction prong 144 drives the galvanometer 90 to decrease the lens aperture and by rotation in the opposite direction prong 146 drives the galvanometer to increase the lens aperture. Thus this manually operable linkage enables both the automatic lens aperture adjustment mechanism and the camera operation disabling mechanism to be overridden. A spring detent 148 mounted adjacent knob 24 engages depression 150 in the knob to control the position of the gear train for automatic operation.

In the electric motor embodiment shown in FIG. 7 the same overriding effect is obtained by means of the single pole double throw switch 138. When this switch is closed (to the position shown in the drawing) a 7.5 volt signal is applied to the voltage dividing network so that the galvanometer and transistor circuit controls the camera operation. When switch 138 is in the second position the transistor circuitry is disconnected from the battery and the motor winding is connected directly across it. In this second switch position switch 136 alone controls motor operation and the camera may be operated even though the photocell 32 detects insufficient light for normal picture taking operations, as for example at spotlighted plays or sporting events. (The diaphragm controlling vane is moved to the desired position by the above described manual adjustment or other suitable means.) These manual overriding mechanisms are also used when the camera is being loaded in subdued light so that the drive motors may be operated to check the proper alignment of the film in the camera for example.

Thus the invention enables a positive camera operation inhibit to be achieved by rendering the control mechanism connecting the operating switch and the shutter and film advancing means inoperative in response to an indication supplied by the delicate galvanometer system. It will be seen that the invention provides a simple and reliable control for the operation of the shutter and film drive mechanism which prevents operation of a camera when the light available for film exposure is of improper magnitude. The control is not susceptible to damage by attempted operation of the manual control switch as that switch is not mechanically locked but rather the film drive and shutter mechanism are rendered inoperative independently thereof. Further, the invention enables the light responsive control mechanism to be easily overridden where the operator so desires. While two embodiments of the invention have been shown and described it will be obvious to those having ordinary skill in the art that various modifications therein may be made and therefore it is not intended that the invention be limited to the disclosed embodiments or to details thereof and departures may be made therefrom within the spirit and scope of the invention as defined in the claims.

We claim:

1. In a photographic camera, the combination of a case, means including a lens structure defining an exposure aperture, means in said case for advancing photographic film past said exposure aperture, a shutter mechanism positioned between said lens structure and said film advancing means for controlling the exposure of the film, a shutter control mechanism including two spaced members, light sensing means mounted on said case for providing a signal indicative of the amount of light available for film exposure purposes, a movable vane element, and means responsive to said signal from said light sensing means for supporting and moving said vane element to a position between said two spaced members, said vane in said position preventing operation of the shutter mechanism when the amount of light sensed by said light sensing means is outside of that range necessary for proper exposure of the film, said vane element being in physical contact with only said vane support means during movement of said vane element.

2. In a photographic camera, the combination of a case, means defining an exposure aperture, shutter means, means for advancing photographic film progressively past said exposure aperture, motor means having an output shaft connected to said film advancing means and said shutter means in driving relation, a mechanical latch operative to prevent rotation of said shaft, an auxiliary latch resiliently coupled to said mechanical latch and also operative to prevent rotation of said shaft, control means manually operable from the exterior of said case for moving said mechanical latch and said auxiliary latch to permit rotation of said shaft at an operator's will, a photoelectric cell arranged to provide a signal as a function of the light impinging thereon, a galvanometer having a coil connected in circuit with said cell, said coil being mounted for rotational movement in response to a change in signal from said photoelectric cell, and a control element connected to move with said coil whereby said control element is directly adjusted by movement of said coil for movement into and out of a limiting position in which position said control element is interposed in the path of said auxiliary latch so that rotation of said shaft is prevented by said auxiliary latch independently of said control means.

3. In a photographic camera, the combination of a case, means defining an exposure aperture, means for advancing photographic film progressively past said exposure aperture, shutter means movable across said exposure aperture for controlling the exposure of the film, latch means operatively associated with said film advancing and shutter means for preventing their operation, control means manually operable from the exterior of said case for releasing said latch means at an operator's will, a photoelectric cell arranged to provide a signal as a function of the light impinging thereon, a galvanometer having a coil connected in circuit with said cell, said coil being mounted for rotational movement in response to a change in signal from said photoelectric cell, auxiliary latch means operatively associated with said film advancing means and said shutter means including a control element physically coupled solely to said galvanometer and connected to move with said coil whereby said control element is directly adjusted by movement of said coil for movement into and out of a limiting position, in which limiting position said auxilary latch means prevents operaton of said film advancing means and said shutter means independently of said control means, a first abutment member connected to move with said coil, and a manually adjustable abutment member engageable with said first abutment member to move said control element from said limiting position and having a nonfunctioning position permitting adjustment of said control element by movement of said coil throughout the range of adjustment thereof by said coil.

4. In a photographic camera, the combination of a case, means defining an exposure aperture, shutter means, an adjustable diaphragm for controlling the size of said exposure aperture, means for advancing photographic film progressively past said exposure aperture, motor means having an output shaft connected to said film advancing means and said shutter means in driving relation, a mechanical latch operative to prevent rotation of said shaft, an auxiliary latch resiliently coupled to said mechanical latch and also operative to prevent rotation of said shaft, control means manually operable from the exterior of said case for moving said mechanical latch and said auxiliary latch to permit rotation of said shaft at an operator's will, a photoelectric cell arranged to provide a signal as a function of the light impinging thereon, a galvanometer having a coil connected in circuit with said cell, said coil being mounted for rotational movement in response to a change in signal from said photoelectric cell, first means coupling said coil and said diaphragm whereby said diaphragm is directly adjusted by movement of said coil to increase and decrease said diaphragm aperture with the decrease and increase respectively of light impinging on said cell, a control element connected to move with said coil whereby said control element is directly adjusted by movement of said coil for movement into and out of a limiting position in which position said control element is interposed in the path of said auxiliary latch so that rotation of said shaft is prevented by said auxiliary latch independently of said control means, a first abutment member connected to move with said coil, and a manually adjustable abutment member engageable with said first abutment member to move said control element from said limiting position and having a nonfunctioning position permitting adjustment of said control element by movement of said coil throughout the range of adjustment thereof by said coil.

5. In a photographic camera, the combination of a case, means including a lens structure defining an exposure aperture, means in said case for advancing photographic film past said exposure aperture, a shutter mechanism positioned between said lens structure and said film advancing means for controlling the exposure of the film, a mechanical latch for preventing operation of said shutter mechanism, a manually operable control element resiliently coupled to said mechanical latch for releasing said latch, light sensing means mounted on said case for providing a signal indicative of the amount of light available for film exposure purposes, drive means responsive to said signal, an elongated movable vane physically coupled solely to said drive means and responsive to said signal from said light sensing means for preventing release of said mechanical latch irrespective of the position of said control element when the amount of light sensed by said light sensing means is outside of that range necessary for proper exposure of the film, and manually operable means for overriding said signal responsive means to permit operation of the shutter mechanism irrespective of the amount of available light.

6. In a photographic camera, the combination of a case,
    means including a lens structure defining an exposure aperture,
    means in said case for advancing said photographic film past said exposure aperture,
    a shutter mechanism positioned between said lens structure and said film advancing means for controlling the exposure of film,
    a shutter latch for preventing the operation of said shutter mechanism,
    control means on said case for releasing said shutter latch to permit operation of said shutter mechanism,
    light sensing means mounted on said case for providing a signal indicative of the amount of light available for film exposure purposes,
    a movable vane element including a radially extending portion,
    and vane drive means responsive to said signal from said light sensing means for moving said vane element when the amount of light sensed by said light sensing means is outside of that range necessary for proper exposure of the film to a position relative to said shutter latch in which position said portion prevents release of said shutter latch,
    said vane element being in physical contact solely with said drive means during movement of said vane element by said drive means.

7. The combination as claimed in claim 6 wherein said shutter latch includes a main mechanical latch directly coupled to said control means and an auxiliary shutter latch resiliently coupled to said control means.

8. In a photographic camera having a shutter mechanism for controlling the recording of images on film, a source of power for operating said shutter mechanism, manually operable control means for controlling the operation for said shutter mechanism, a shutter control mechanism having two spaced members, a vane adapted to be interposed between said spaced members, light sensing means for providing a signal indicative of the amount of light available for image recording purposes, and vane drive means responsive to said signal from said light sensing means for moving said vane to a position between said spaced members to control the operability of said shutter mechanism as a function of the amount of light sensed by said light sensing means.

9. The camera as claimed in claim 8 wherein one of said spaced members is a shutter latch movable between a first position latching said shutter mechanism and a second position releasing said shutter mechanism, and said vane, when in position between said two spaced members, prevents movement of said shutter latch to said second position.

10. The camera as claimed in claim 8 wherein one of said spaced members is a photocell.

References Cited in the file of this patent

UNITED STATES PATENTS

| | | |
|---|---|---|
| 2,841,064 | Bagby | July 1, 1958 |
| 2,974,578 | Wittel | Mar. 14, 1961 |
| 2,991,704 | Pickens | July 11, 1961 |
| 2,995,996 | Gossen | Aug. 15, 1961 |
| 3,023,665 | Estes | Mar. 6, 1962 |